United States Patent
Park

(10) Patent No.: US 8,929,885 B2
(45) Date of Patent: Jan. 6, 2015

(54) APPARATUS AND METHOD FOR SELECTING SPOT BEAM BASED ON TRAFFIC DEMANDS AND CHANNEL CONDITIONS FOR MULTI-SPOT BEAM SATELLITE SYSTEM

(75) Inventor: Un Hee Park, Gwangju (KR)

(73) Assignee: SK Hynix Inc., Gyeonggi-do (KR)

( * ) Notice: Subject to any disclaimer, the term of this patent is extended or adjusted under 35 U.S.C. 154(b) by 494 days.

(21) Appl. No.: 13/555,325

(22) Filed: Jul. 23, 2012

(65) Prior Publication Data

US 2013/0045675 A1    Feb. 21, 2013

(30) Foreign Application Priority Data

Aug. 18, 2011  (KR) .................. 10-2011-0082275
Mar. 22, 2012  (KR) .................. 10-2012-0029480

(51) Int. Cl.
*H04B 7/185*  (2006.01)
*H04W 4/00*  (2009.01)
*H04B 7/204*  (2006.01)

(52) U.S. Cl.
CPC .................... *H04B 7/2041* (2013.01)
USPC ....... 455/427; 455/12.1; 455/3.02; 455/452.1

(58) Field of Classification Search
CPC ........................ H04B 7/18539; H04B 7/2041
USPC .............. 455/427, 12.1, 3.02, 3.01, 429, 450, 455/452.1, 423, 13.3, 509, 67.11; 370/328
See application file for complete search history.

(56) References Cited

U.S. PATENT DOCUMENTS

| | | | |
|---|---|---|---|
| 6,233,451 B1 | 5/2001 | Noerpel et al. | |
| 2003/0166401 A1* | 9/2003 | Combes et al. | 455/427 |
| 2005/0180354 A1* | 8/2005 | Cho et al. | 370/328 |
| 2008/0233865 A1* | 9/2008 | Malarky et al. | 455/12.1 |

* cited by examiner

*Primary Examiner* — John J Lee
(74) *Attorney, Agent, or Firm* — William Park & Associates Patent Ltd.

(57) ABSTRACT

Disclosed is an apparatus and method of selecting spot beams to be actually used based on a traffic demand and a signal attenuation of each spot beam, and activating the selected spot beams in a satellite communication system having multiple spot beams.

A control apparatus of a multi-spot beam satellite may include a beam selector to select, from among a plurality of spot beams, at least one spot beam to be assigned with a transmission resource, and an assignment resource determining unit to determine a transmission resource to be assigned to the selected at least one spot beam.

10 Claims, 5 Drawing Sheets

APPARATUS AND METHOD FOR SELECTING SPOT BEAM BASED ON TRAFFIC DEMANDS AND CHANNEL CONDITIONS FOR MULTI-SPOT BEAM SATELLITE SYSTEM

CROSS-REFERENCE TO RELATED APPLICATIONS

This application claims the priority benefit of Korean Patent Application No. 10-2011-0082275, filed on Aug. 18, 2011, in the Korean Intellectual Property Office, and No. 10-2012-0029480, filed on Mar. 22, 2012, in the Korean Intellectual Property Office, the disclosures of which are incorporated herein by reference.

BACKGROUND

1. Field of the Invention

The present invention relates to an apparatus and method for selecting a spot beam based on a traffic amount and a channel condition in a multi-spot beam satellite, and more particularly, to an apparatus and method for selecting spot beams to be actually used based on a traffic demand and a signal attenuation of each spot beam, and activating the selected spot beams in a satellite communication system having multiple spot beams.

2. Description of the Related Art

A multi-spot beam antenna technology may construct a flexible service by generating a beam pattern that has a high directivity and a narrow beam width, by performing inter-beam switching over a plurality of regions through a high speed phase conversion, and by efficiently operating limited communication resources.

In a multi-beam satellite system using the conventional multi-spot beam antenna technology, a user may form a communication link by selecting a spot beam with the most excellent channel state from among a plurality of spot beams that are connectable to the user. In the conventional multi-beam satellite system, the user selects a spot beam. Therefore, even though all the spot beams connectable to a user who desires to be assigned with a resource have a poor channel state, the user may need to select a single spot beam and to form a communication link. Accordingly, a total communication amount of a system may be degraded.

Accordingly, there is a desire for a method that may prevent degradation in a total system communication amount.

SUMMARY

An aspect of the present invention provides an apparatus and method that may prevent an unnecessary use of resource and degradation in a total system communication amount by minimizing a difference between a traffic demand of each spot beam and a resource to be assigned.

According to an aspect of the present invention, there is provided a control apparatus of a multi-spot beam satellite, including: a beam selector to select, from among a plurality of spot beams, at least one spot beam to be assigned with a transmission resource; and an assignment resource determining unit to determine a transmission resource to be assigned to the selected at least one spot beam.

The control apparatus may further include an information collector to collect a traffic demand and a signal attenuation of each of the plurality of spot beams. The beam selector may select, from among the plurality of spot beams, the at least one spot beam to be assigned with the transmission resource based on the traffic demand and the signal attenuation.

The beam selector may select the at least one spot beam to be assigned with the transmission resource by applying a beam selection algorithm for a power assignment scheme to a traffic demand and a signal attenuation of each of the plurality of spot beams.

The beam selector may select the at least one spot beam to be assigned with the transmission resource by applying a beam selection algorithm for a band assignment scheme to a traffic demand and a signal attenuation of each of the plurality of spot beams.

According to another aspect of the present invention, there is provided a control method of a multi-spot beam satellite, including: selecting, from among a plurality of spot beams, at least one spot beam to be assigned with a transmission resource; and determining a transmission resource to be assigned to the selected at least one spot beam.

According to embodiments of the present invention, there may be provided an apparatus and method for selecting spot beams to be actually used based on a traffic demand and a signal attenuation of each spot beam, and activating the selected spot beams in a satellite communication system having multiple spot beams. Accordingly, it is possible to prevent an unnecessary use of resource and degradation in a total system communication amount by minimizing a difference between a traffic demand of each spot beam and a resource to be assigned.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
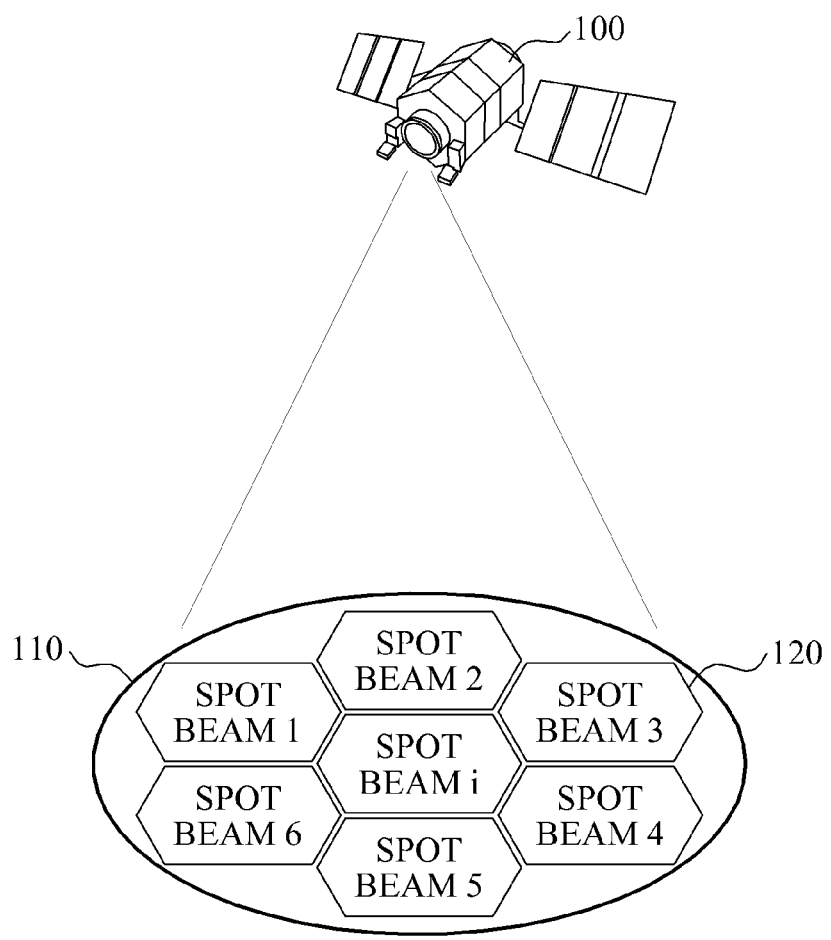
FIG. 1 is a diagram illustrating a multi-spot beam satellite system according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a multi-spot beam satellite system according to an embodiment of the present invention.

In the multi-spot beam satellite system according to an embodiment of the present invention, a satellite 100 including a plurality of spot beams 110 may form a communication link with terminals positioned within satellite coverage 110 using the plurality of spot beams 110. Here, when directions of spot beams propagated by the satellite 100 are within the satellite coverage 100, there is no particular constraint and the satellite 100 may simultaneously propagate the plurality of spot beams 110. The satellite 100 including the plurality of spot beams 110 may also be referred to as a multi-spot beam satellite.

Here, the plurality of spot beams 120 may form a beam pattern having a sufficiently narrow beam width to ignore inter-spot beam interference, and may have different traffic demand $T_i$ and signal attenuation $\alpha_i^2$. Also, N denoting a total number of spot beams available by the satellite 100 may be greater than or equal to K denoting the number of spot beams actually used by the satellite 100. That is, when a portion of the spot beams 110 needs a large amount of communication resources, the satellite 100 may use only the number of spot beams less than N.

The satellite 100 according to the present invention may select spot beams to be actually used based on traffic demand and signal attenuation of each spot beam, and may assign communication capacity $C_i$ to the selected spot beams and thereby activate the selected spot beams. Accordingly, it is possible to prevent an unnecessary use of resources by minimizing a difference between the traffic demand of each spot beam and the resource to be assigned.

Specifically, according to an embodiment of the present invention, a control apparatus of a satellite may estimate channel states of spot beams based on traffic demand of the spot beams and signal attenuation, and may select spot beams to be assigned with the communication capacity based on the estimation results. Accordingly, it is possible to prevent a single spot beam from occupying great communication capacity by setting a communication link with a spot beam having a poor channel state.

Here, the control apparatus of the satellite may select spot beams to be actually used by employing a different algorithm based on a communication resource assignment scheme.

Figure 2:
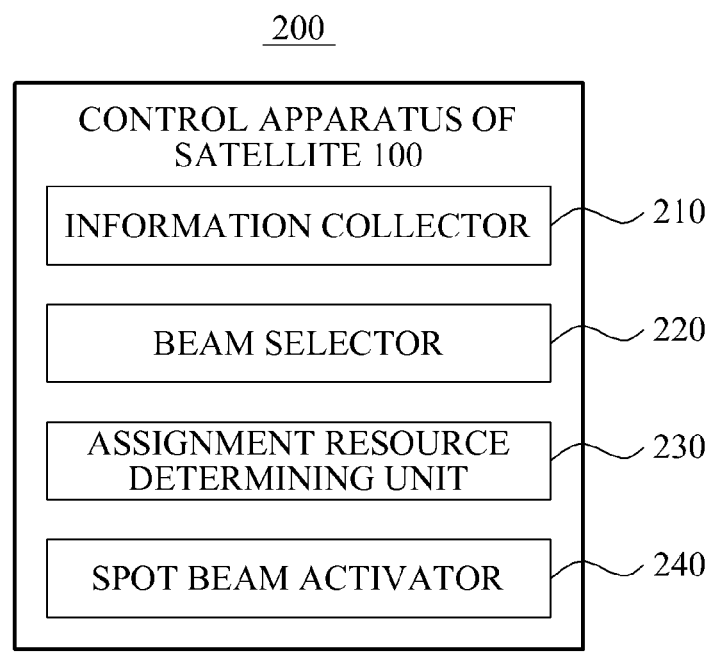
FIG. 2 is a block diagram illustrating a control apparatus of a multi-spot beam satellite according to an embodiment of the present invention.

FIG. 2 is a block diagram illustrating a control apparatus 200 of the satellite 100 corresponding to a multi-spot beam satellite according to an embodiment of the present invention.

Referring to FIG. 2, the control apparatus 200 of the satellite 100 may include an information collector 210, a beam selector 220, an assignment resource determining unit 230, and a spot beam activator 240.

The information collector 210 may collect traffic demand and signal attenuation of each of spot beams available in the satellite 100.

The beam selector 220 may select, from the available spot beams, at least one spot beam to be assigned with a transmission resource.

In this instance, the beam selector 220 may select spot beams to be assigned with a transmission resource based on the traffic demand and the signal attenuation of each of the spot beams collected by the information collector 210.

For example, the beam selector 220 may select spot beams to be assigned with a transmission resource by applying a beam selection algorithm for a power assignment scheme to the traffic demand and the signal attenuation. The beam selection algorithm for the power assignment scheme will be described with reference to FIG. 3.

Also, the beam selector 220 may select spot beams to be assigned with a transmission resource by applying a beam selection algorithm for a band assignment scheme to the traffic demand and the signal attenuation. The beam selection algorithm for the band assignment scheme will be described in detail with reference to FIG. 4.

The assignment resource determining unit 230 may determine a transmission resource to be assigned to the spot beams selected by the beam selector 220.

For example, when the beam selector 220 selects spot beams by applying the beam selection algorithm for the power assignment scheme, the assignment resource determining unit 230 may fix bands of all the spot beams and assign different power for each spot beam.

Also, when the beam selector 220 selects spot beams by applying the beam selection algorithm for the band assignment scheme, the assignment resource determining unit 230 may fix power of all the spot beams and assign a different band for each spot beam.

The spot beam activator 240 may activate the spot beams selected by the beam selector 220 using the transmission resource assigned by the assignment resource determining unit 230, so that the spot beams selected by the beam selector 220 may set a communication link with a terminal or a receiver positioned on the ground.

Figure 3:
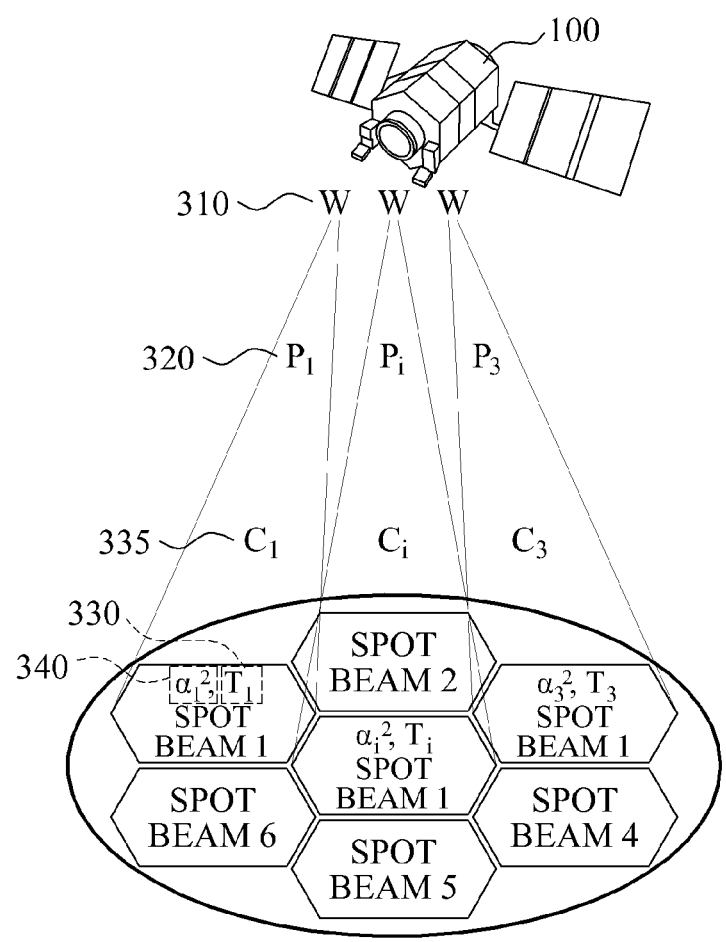
FIG. 3 is a diagram illustrating an example of controlling a multi-spot beam satellite using a power assignment scheme according to an embodiment of the present invention.

FIG. 3 is a diagram illustrating an example of controlling the satellite 100 corresponding to a multi-spot beam satellite using a power assignment scheme according to an embodiment of the present invention.

As shown in FIG. 3, the control apparatus 200 of the satellite 100 may fix bands of spot beams to W 310, and may select spot beams to be assigned with a transmission resource by applying a beam selection algorithm for a power assignment scheme to traffic demand $T_i$ 330 and signal attenuation $\alpha_i^2$ 340 of each spot beam. Next, the control apparatus 200 of the satellite 100 may activate the selected spot beams and may assign different power $P_i$ 320 to each activated spot beam. Here, the control apparatus 200 of the satellite 100 may select and thereby activate only spot beams having communication capacity greater than communication capacity $C_i$ assignable to corresponding spot beams, based on traffic demand $T_i$ of a terminal. Accordingly, it is possible to maximize the use efficiency of limited communication resources.

To enhance the total system capacity by minimizing the consumption of power resource, the control apparatus 200 of the satellite 100 may enable the traffic demand $T_i$ and the communication capacity $C_i$, assigned to the spot beams, to be nearly matched with each other. That is, the system capacity may increase according to a decrease in the difference between, $T_i$ and $C_i$.

Accordingly, the control apparatus 200 of the satellite 100 may define Equation 1 through Equation 4 using a secondary cost function.

Here, Equation 1 may be a cost function that needs to be considered to solve an optimization problem with respect to a selection of a beam to be activated and an assignment of beam power.

$$\text{Minimize } \Sigma(T_i - C_i)^2 \quad \text{[Equation 1]}$$

Using Equation 1, the control apparatus 200 of the satellite 100 may construct a satellite communication system having the flexibility of beam power by finding beam power $P_{opt}$ that minimizes the difference between the traffic demand and assignable communication capacity and by maximizing the total system capacity.

Equation 2 and Equation 3 may be constraint conditions of a system.

$$C_i = W_i \log_2\left(1 + \frac{\alpha_i^2 P}{W_i N_0}\right) \leq T_i \quad \text{[Equation 2]}$$

Only when traffic demand $T_i$ of spot beams is greater than the communication capacity $C_i$ assignable to the corresponding spot beams using Equation 2, the control apparatus 200 of the satellite 100 may select the corresponding spot beams as spot beams to be assigned with a transmission resource.

$$\Sigma P_i \leq P_{total} \quad \text{[Equation 3]}$$

According to Equation 3, the control apparatus 200 of the satellite 100 may enable a sum of power $P_i$ assigned to the respective spot beams not to exceed the total power $P_{total}$ assignable by the satellite 100. Here, $N_o$ denotes noise power density.

$$-P_i \leq 0 \quad \text{[Equation 4]}$$

According to Equation 4, the control apparatus 200 of the satellite 100 may assign power to the spot beams, which are selected as spot beams to be assigned with a transmission power, instead of assigning zero.

The control apparatus 200 of the satellite 100 may define, as Equation 5, an equation in which a Lagrange function is applied to find an optimization solution about a beam selection in a minimization problem where constraint functions of Equation 1 through Equation 4 are present.

$$L(P_i, \Lambda, s_i) = \Sigma_i (T_i - C_i)^2 + \Lambda(\Sigma_i P_i - P_{total}) + \Sigma_i s_i(-P_i) \quad \text{[Equation 5]}$$

In Equation 5, $\Lambda$ denotes a Lagrange multiplier determined according to the constraint condition of Equation 3, and $s_i$ denotes a Lagrange multiplier determined according to the constraint condition of Equation 4.

When performing partial differentiation of Equation 5 with respect to $P_i$, Equation 6 may be induced.

$$\frac{\partial L(P_i, \Lambda, s_i)}{\partial P_i} = \frac{\partial \sum_i (T_i - C_i)^2}{\partial P_i} + \Lambda - s_i \quad \text{[Equation 6]}$$

Here, when applying Kuhn-Tucker arrangement to Equation 6, Equation 7 may be defined.

When $P_i > 0, s_i = 0$.

When $P_i = 0, s_i \geq 0$. [Equation 7]

Initially, when the optimal power assignment amount $P_i^*$ is greater than zero, that is, when $P_i > 0$, Equation 8 may be satisfied according to Equation 7 and a Lagrange function theory. Here, Equation 6 may be expanded like Equation 9 using Equation 8.

$$s_i = 0, \left.\frac{\partial L(P_i, \Lambda, s_i)}{\partial P_i}\right|_{P_i = P_i^*} = 0 \quad \text{[Equation 8]}$$

$$-\left.\frac{\partial \sum_i (T_i - C_i)^2}{\partial P_i}\right|_{P_i = P_i^*} = \Lambda < -\left.\frac{\partial \sum_i (T_i - C_i)^2}{\partial P_i}\right|_{P_i = 0} \quad \text{[Equation 9]}$$

Here, due to a concavity characteristic of the communication capacity $C_i$, relationship of Equation 9 may be established.

When $P_j = 0$ with respect to a $j^{th}$ beam, Equation 10 may be satisfied according to Equation 7 and a Lagrange function theory. Here, Equation 6 may be expanded like Equation 11 using Equation 10.

$$s_j \geq 0 \text{ and } \left.\frac{\partial L(P_j, \Lambda, s_j)}{\partial P_j}\right|_{P_j = 0} = 0 \quad \text{[Equation 10]}$$

$$-\left.\frac{\partial \sum_i (T_i - C_i)^2}{\partial P_j}\right|_{P_j = 0} + s_j = \Lambda \geq -\left.\frac{\partial \sum_j (T_j - C_j)^2}{\partial P_j}\right|_{P_j = 0} \quad \text{[Equation 11]}$$

By comparing right sides of Equation 9 and Equation 11 with respect to the common factor $\Lambda$ of Equation 9 and Equation 11, Equation 12 may be obtained.

$$-\left.\frac{\partial \sum_i (T_i - C_i)^2}{\partial P_i}\right|_{P_i = 0} = \frac{2T_i \alpha_i^2}{N_0 \ln 2} \quad \text{[Equation 12]}$$

Here, the control apparatus 200 of the satellite 100 may sequentially select K spot beams in a descending order of values of Equation 12 with respect to the respective spot beams having traffic demand, and may activate the selected K spot beams.

Also, factors affecting a result value of Equation 12 may be traffic demand $T_i$ and signal attenuation $\alpha_i^2$ of each spot beam, and other factors may have a common value with respect to all the spot beams.

That is, the beam selection algorithm for the power assignment scheme may be an algorithm of calculating $T_i \alpha_i^2$ values of the respective spot beams, and sequentially selecting K spot beams in a descending order of $T_i \alpha_i^2$ values.

Accordingly, the control apparatus 200 of the satellite 100 may compare $T_i \alpha_i^2$ values of the spot beams, and may sequentially select K spot beams in a descending order of $T_i \alpha_i^2$ values and activate the selected spot beams.

Figure 4:
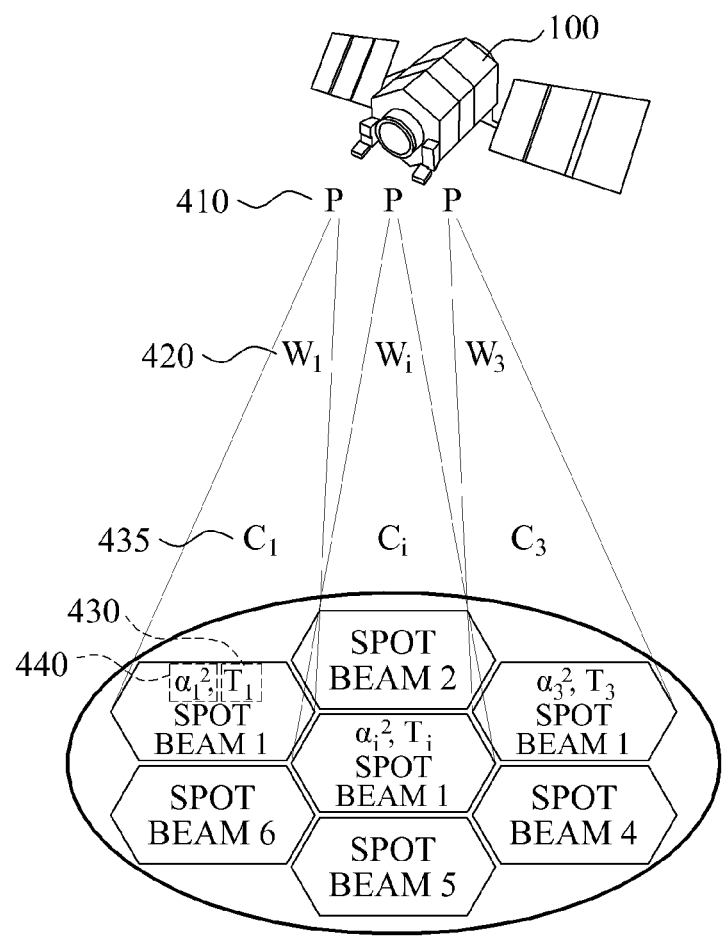
FIG. 4 is a diagram illustrating an example of controlling a multi-spot beam satellite using a band assignment scheme according to an embodiment of the present invention.

FIG. 4 is a diagram illustrating an example of controlling the satellite 100 corresponding to a multi-spot beam satellite using a band assignment scheme according to an embodiment of the present invention.

As shown in FIG. 4, the control apparatus 200 of the satellite 100 may fix transmission power of spot beams to P 410, and may select spot beams to be assigned with a transmission resource by applying a beam selection algorithm for a band assignment scheme to traffic demand $T_i$ 430 and signal attenuation $\alpha_i^2$ 440 of each spot beam. Next, the control apparatus 200 of the satellite 100 may activate the selected spot beams and may assign different bandwidth $W_i$ 420 to each activated spot beam.

Also, the control apparatus 200 of the satellite 100 may define Equation 1, Equation 2, Equation 13, and Equation 14 using a secondary cost function.

For the beam selection algorithm for the beam band assignment scheme, the following constraint conditions may be added.

$$\Sigma W_i \leq W_{total} \quad \text{[Equation 13]}$$

According to Equation 13, the control apparatus 200 of the satellite 100 may enable a sum of bandwidth $W_1$ assigned to the respective spot beams not to exceed the total bandwidth $W_{total}$ assignable by the satellite 100. Here, $N_o$ denotes noise power density.

$$-W_i \leq 0 \quad \text{[Equation 14]}$$

According to Equation 14, the control apparatus 200 of the satellite 100 may assign a bandwidth to the spot beams, which are selected as spot beams to be assigned with a transmission resource, instead of assigning zero.

The control apparatus 200 of the satellite 100 may define, as Equation 15, $W_i$ equation in which a Lagrange function is applied to find an optimization solution about a beam selection in a minimization problem where constraint functions of Equation 1, Equation 2, Equation 13, and Equation 14 are present.

$$L(W_i, \Lambda, s_i) = \Sigma_i (T_i - C_i)^2 + \Lambda(\Sigma_i W_i - W_{total}) + \Sigma_i v_i(-W_i) \quad \text{[Equation 15]}$$

In Equation 15, $\Lambda$ denotes a Lagrange multiplier determined according to the constraint condition of Equation 13, and $v_i$ denotes a Lagrange multiplier determined according to the constraint condition of Equation 14.

When performing partial differentiation of Equation 15 with respect to $W_i$, Equation 16 may be induced.

$$\frac{\partial L(W_i, \Lambda, v_i)}{\partial W_i} = \frac{\partial \sum_i (T_i - C_i)^2}{\partial W_i} + \Lambda - v_i \quad \text{[Equation 16]}$$

Here, when applying Kuhn-Tucker arrangement to Equation 16, Equation 17 may be defined.

When $W_i > 0, v_i = 0$.

When $W_j = 0, v_j \geq 0$. [Equation 17]

Initially, when the optimal bandwidth assignment amount $W_i^*$ is greater than zero, that is, when $W_i^* > 0$, Equation 18 may be satisfied according to Equation 17 and a Lagrange function theory. Here, Equation 16 may be expanded like Equation 19 using Equation 18.

$$v_i = 0, \left. \frac{\partial L(W_i, \Lambda, v_i)}{\partial W_i} \right|_{W_i = W_i^*} = 0 \quad \text{[Equation 18]}$$

$$-\left. \frac{\partial \sum_i (T_i - C_i)^2}{\partial W_i} \right|_{W_i = W_i^*} = \Lambda < -\left. \frac{\partial \sum_i (T_i - C_i)^2}{\partial W_i} \right|_{W_i = 0} \quad \text{[Equation 19]}$$

Here, due to a concavity characteristic of the communication capacity $C_i$, relationship of Equation 19 may be established.

When $W_j = 0$, and in this instance, it is optimal with respect to a $j^{th}$ beam, Equation 20 may be satisfied according to Equation 17 and a Lagrange function theory. Here, Equation 16 may be expanded like Equation 21 using Equation 20.

$$v_j \geq 0 \text{ and } \left. \frac{\partial L(W_j, \Lambda, v_j)}{\partial W_j} \right|_{W_j = 0} = 0 \quad \text{[Equation 20]}$$

$$-\left. \frac{\partial \sum_i (T_i - C_i)^2}{\partial W_j} \right|_{W_j = 0} + v_j = \Lambda \geq -\left. \frac{\partial \sum_j (T_j - C_j)^2}{\partial W_j} \right|_{W_j = 0} \quad \text{[Equation 21]}$$

By comparing right sides of Equation 19 and Equation 21 with respect to the common factor $\Lambda$ of Equation 19 and Equation 21, Equation 22 may be obtained.

$$-\left. \frac{\partial \sum_i (T_i - C_i)^2}{\partial W_i} \right|_{W_i = 0} = 2T_i \left( \log_2(\alpha_i^2) - \frac{1}{\ln 2} \right) + 2T_i \cdot \lim_{W_i \to 0} \log_2\left( \frac{P}{W_i N_0} \right) \quad \text{[Equation 22]}$$

Here, the control apparatus 200 of the satellite 100 may sequentially select K spot beams in a descending order of values of Equation 22 with respect to the respective spot beams having traffic demand, and may activate the selected K spot beams.

Also, in Equation 22, $$2T_i \cdot \lim_{W_i \to 0} \log_2\left( \frac{P}{W_i N_0} \right)$$

is infinitely approximated and thus, $$T_i \left( \log_2(\alpha_i^2) - \frac{1}{\ln 2} \right)$$

may be a factor that affects a value of Equation 22.

That is, the beam selection algorithm for the band assignment scheme may be an algorithm of calculating $$T_i \left( \log_2(\alpha_i^2) - \frac{1}{\ln 2} \right)$$

values of the respective spot beams and sequentially selecting K spot beams in a descending order of $$T_i \left( \log_2(\alpha_i^2) - \frac{1}{\ln 2} \right)$$

values.

Accordingly, the control apparatus 200 of the satellite 100 may compare $$T_i \left( \log_2(\alpha_i^2) - \frac{1}{\ln 2} \right)$$

values, and may sequentially select K spot beams in a descending order of $$T_i \left( \log_2(\alpha_i^2) - \frac{1}{\ln 2} \right)$$

values, and may activate the selected K spot beams.

Figure 5:
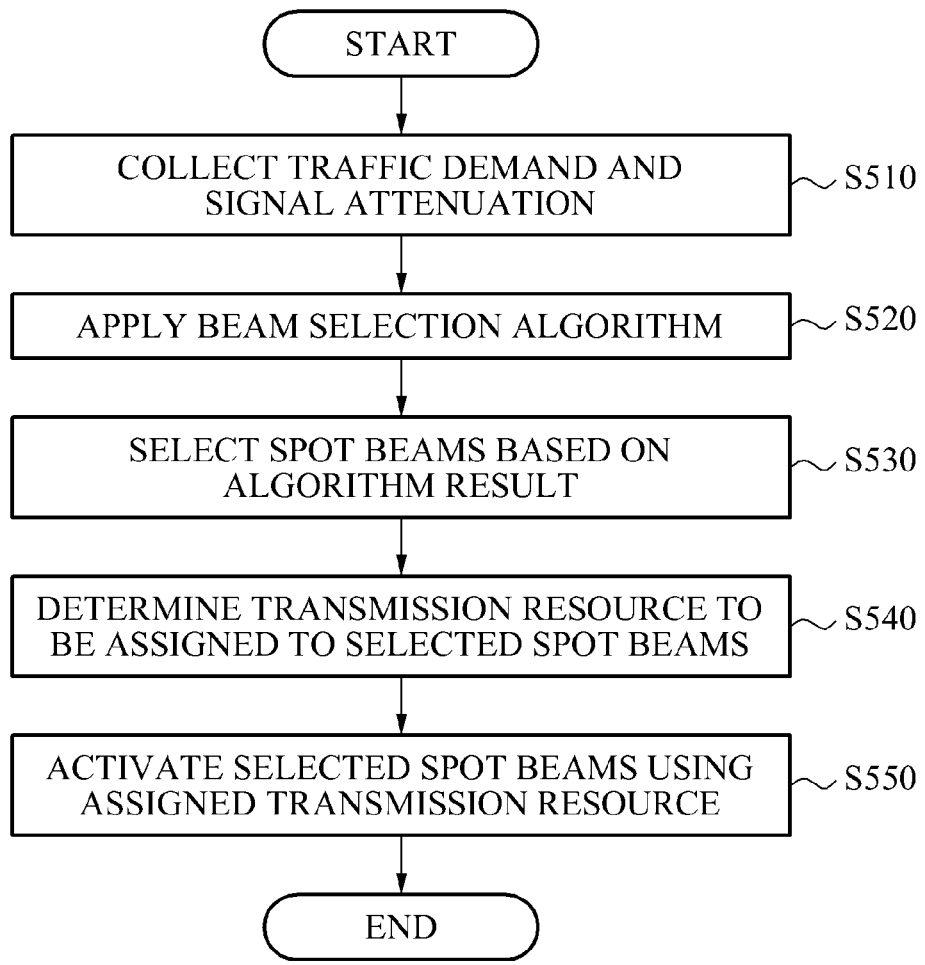
FIG. 5 is a flowchart illustrating a control method of a multi-spot beam satellite according to an embodiment of the present invention.

FIG. 5 is a flowchart illustrating a control method of the satellite 100 corresponding to a multi-spot beam satellite according to an embodiment of the present invention.

In operation S510, the information collector 210 may collect traffic demand and signal attenuation of each of spot beams available in the satellite 100.

In operation S520, the beam selector 220 may calculate a value by applying a beam selection algorithm to the collected traffic demand and signal attenuation.

For example, when the satellite 110 employs a power assignment scheme, the beam selector 220 may calculate a $T_i \alpha_i^2$ value of each spot beam by applying a beam selection algorithm for the power assignment scheme. Also, when the satellite 110 employs a band assignment scheme, the beam selector 220 may calculate a $$T_i\left(\log_2(\alpha_i^2) - \frac{1}{\ln 2}\right)$$

value by applying a beam selection algorithm for the band assignment scheme.

In operation S530, the beam selector 220 may select spot beams to be assigned with a transmission resource based on the calculated algorithm result value.

For example, when the satellite 110 employs the power assignment scheme, the beam selector 220 may sequentially select K spot beams in a descending order of $T_i \alpha_i^2$ values of the respective spot beams. Also, when the satellite 110 employs the band assignment scheme, the beam selector 220 may sequentially select K spot beams in a descending order of $$T_i\left(\log_2(\alpha_i^2) - \frac{1}{\ln 2}\right)$$

values of the respective spot beams.

In operation S540, the assignment resource determining unit 230 may determine a transmission resource to be assigned to the spot beams selected in operation S530.

For example, when the beam selector 220 selects spot beams by applying the beam selection algorithm for the power assignment scheme, the assignment resource determining unit 230 may fix bands of all the spot beams and assign a different power for each spot beam. Also, when the beam selector 220 selects spot beams by applying the beam selection algorithm for the band assignment scheme, the assignment resource determining unit 230 may fix power of all the spot beams and assign a different band for each spot beam.

In operation S550, the spot beam activator 240 may activate the spot beams selected in operation S530, using the transmission resource assigned in operation S540. Here, the spot beams selected by the beam selector 220 may set a communication link with a terminal or a receiver positioned on the ground.

According to embodiments of the present invention, in a satellite communication system having multiple spot beams, it is possible to select spot beams to be actually used based on traffic demand and signal attenuation of each spot beam, to assign communication capacity to the selected spot beams, and to thereby activate the selected spot beams. Through this, it is possible to prevent an unnecessary use of resource and degradation in a total system communication amount by minimizing a difference between a traffic demand of each spot beam and a resource to be assigned.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A control apparatus of a multi-spot beam satellite, comprising:
a beam selector to select, from among a plurality of spot beams, at least one spot beam to be assigned with a transmission resource
an assignment resource determining unit to determine a transmission resource to be assigned to the selected at least one spot beam; and
an information collector to collect a traffic demand and a signal attenuation of each of the plurality of spot beams,
wherein the beam selector selects, from among the plurality of spot beams, the at least one spot beam to be assigned with the transmission resource based on the traffic demand and the signal attenuation.

2. The control apparatus of claim 1, wherein the beam selector selects the at least one spot beam to be assigned with the transmission resource by applying a beam selection algorithm for a power assignment scheme to a traffic demand and a signal attenuation of each of the plurality of spot beams.

3. The control apparatus of claim 2, wherein the assignment resource determining unit fixes bands of all the spot beams and assigns different power for each selected spot beam.

4. The control apparatus of claim 1, wherein the beam selector selects the at least one spot beam to be assigned with the transmission resource by applying a beam selection algorithm for a band assignment scheme to a traffic demand and a signal attenuation of each of the plurality of spot beams.

5. The control apparatus of claim 4, wherein the assignment resource determining unit fixes power of all the spot beams and assigns a different band for each selected spot beam.

6. A control method of a multi-spot beam satellite, comprising:
selecting, from among a plurality of spot beams, at least one spot beam to be assigned with a transmission resource
determining a transmission resource to be assigned to the selected at least one spot beam; and
collecting a traffic demand and a signal attenuation of each of the plurality of spot beams,
wherein the selecting comprises selecting, from among the plurality of spot beams, the at least one spot beam to be assigned with the transmission resource based on the traffic demand and the signal attenuation.

7. The method of claim 6, wherein the selecting comprises selecting the at least one spot beam to be assigned with the transmission resource by applying a beam selection algorithm for a power assignment scheme to a traffic demand and a signal attenuation of each of the plurality of spot beams.

8. The method of claim 7, wherein the determining comprises fixing bands of all the spot beams and assigning different power for each selected spot beam.

9. The method of claim 6, wherein the selecting comprises selecting the at least one spot beam to be assigned with the transmission resource by applying a beam selection algorithm for a band assignment scheme to a traffic demand and a signal attenuation of each of the plurality of spot beams.

10. The method of claim 9, wherein the determining comprises fixing power of all the spot beams and assigning a different band for each selected spot beam.

* * * * *